W. J. EHRSAM, E. H. SIEDER & L. N. MORSCHER.
THROWING WHEEL FOR GRADERS.
APPLICATION FILED AUG. 18, 1909.

976,350.

Patented Nov. 22, 1910.

Witnesses
Walter Troemel.
Thomas W. McMeans

Inventors
Lawrence N. Morscher.
William J. Ehrsam, and
Ernest H. Sieder.
By Bradford Hood, Attorneys

UNITED STATES PATENT OFFICE.

WILLIAM J. EHRSAM AND ERNST H. SIEDER, OF ENTERPRISE, AND LAWRENCE N. MORSCHER, OF LAWRENCE, KANSAS, ASSIGNORS TO WILLIAM J. EHRSAM, OF ENTERPRISE, KANSAS, AND LAWRENCE N. MORSCHER, OF LAWRENCE, KANSAS, COTRUSTEES.

THROWING-WHEEL FOR GRADERS.

976,350.     Specification of Letters Patent.     Patented Nov. 22, 1910.

Application filed August 18, 1909. Serial No. 513,536.

*To all whom it may concern:*

Be it known that we, WILLIAM J. EHRSAM and ERNST H. SIEDER, residing at Enterprise, in the county of Dickinson, and LAWRENCE N. MORSCHER, residing at Lawrence, in the county of Douglas, State of Kansas, citizens of the United States, have invented certain new and useful Improvements in Throwing-Wheels for Graders, of which the following is a specification.

This invention relates to an improved form of throwing wheel for use in machines for grading material by means of the action of a deflecting air current upon projected particles having high velocities, and is especially designed for use in an apparatus similar to that shown in the application of Lawrence N. Morscher, filed October 23, 1908, Serial Number 459,155.

In order that there may be a uniformity of separation it is essential not only that the deflecting air current shall be maintained at a uniform velocity ratio relative to the velocity of the particles, but it is also highly desirable that the projection of the particles, shall be definite as to direction and also uniform as to quantity and velocity. We have found, therefore, that it is desirable to mechanically engage practically every particle so as to positively propel it.

The object of our present invention is therefore to produce a propelling mechanism which is capable of receiving a stream of particles in somewhat variable quantities and delivering the same at high velocity in a very thin and uniform sheet, each particle of the mass being practically mechanically engaged and propelled.

The accompanying drawings illustrate our invention.

Figure 1:
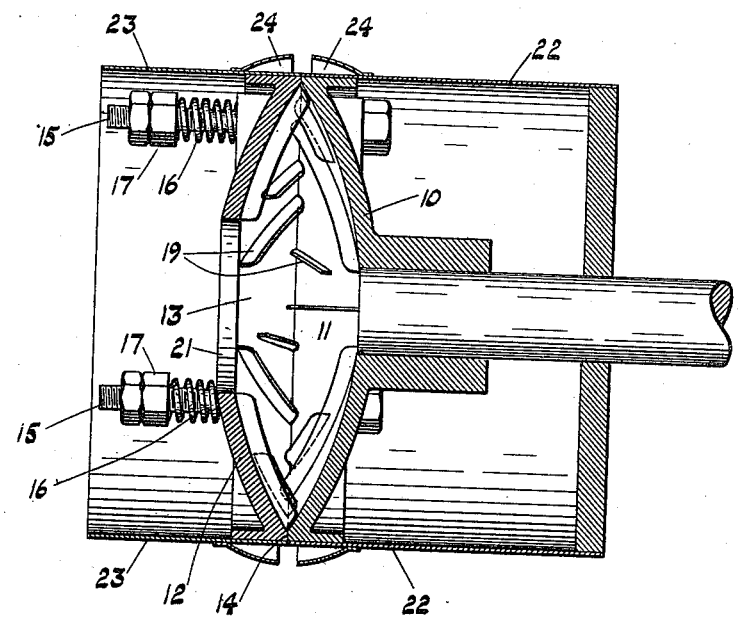
Figure 2:
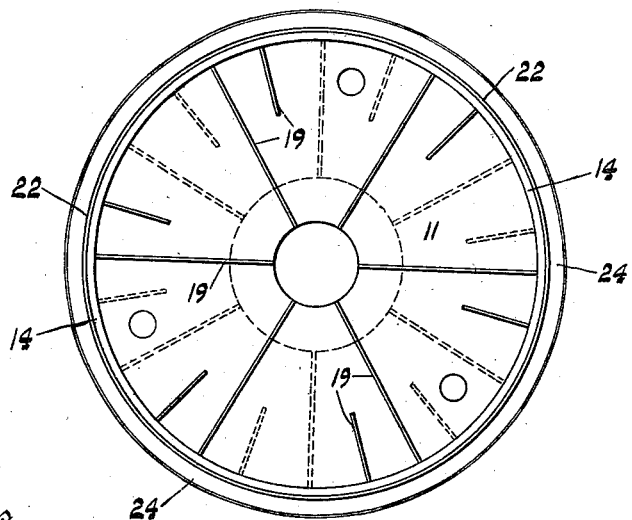

Figure 1 is an axial section of a throwing wheel constructed in accordance with our invention; Fig. 2 a front elevation of one of the members.

In the drawings 10 indicates a rotatable disk having a concave or cup-shaped face 11. Co-acting with the disk 10 is a similar disk 12 having a concave or cup-shaped face 13 which is arranged to complement the face 11 of disk 10, the two disks being fitted at their adjacent edges 14 so as to close tightly together. The two disks are held together for rotation by means of bolts 15, carried by one of the disks and passed through the other, and said disks are yieldingly held together axially by means of springs 16 which may be conveniently mounted upon the bolts 15, nuts 17 being provided for adjusting the tension of the springs. The faces 11 and 13 are provided with radially extending ribs 19 and disk 12 is provided with a central feed opening 21.

In order to prevent the granular material which issues from between the two disks, from dropping back into engagement with the exteriors of the disks, disk 10 is provided with a protecting cylindrical shell 22 and disk 12 with a similar protecting shell 23.

In order to permit a slight spreading of the material as it issues from between the disks, it is sometimes desirable to provide the apparatus with flaring ring-lips 24 24 which are secured to the shells 22 and 23, these lips forming an annular dead air space into which the deflecting air current does not pass.

We are aware that many forms of impellers have been provided in which impelling vanes impart a tangential motion to the particles but, so far as we know, these devices permit a free radial movement and therefore the radial movement varies to a considerable extent by reason of the shape of the particles and their correlation, as well as the varying depth of the particular particle within the accompanying mass of moving particles resting against the impelling vanes. As a consequence the velocity of departure of the various particles from the impeller varies considerably and renders considerably inaccurate the separating action, especially where the character of separation of the impelled particles is determined by a deflecting fluid current passing through the trajectory. We are also aware that certain centrifugal separators have been formed by two hollow mating members having a yielding contact, such for instance as the structure shown in Patent No. 439,173 to Newbery et al, but in such a device the interior of the rotating member is necessarily smooth and free from obstruction and a separation of particles of different grades is accomplished, the lighter particles being kept inside of the chamber or discharged through a totally different outlet. In such an apparatus the speed of rotation must necessarily be comparatively low because if the speed of rotation were high enough all of the solids would be expelled from between the members and under such conditions the lack of retaining vanes within the structure will cause a decided variation in velocities of ejection of the different particles, thus making the feed irregular and uncertain. With our construction, on the contrary, each particle is substantially uniformly ejected.

The operation is as follows: The disks are rotated at a high speed and granular material fed through opening 21 into the space formed between faces 11 and 13, and is there engaged by the ribs 19. The centrifugal force imparted to the particles within the chamber of the impeller will cause the particles to crowd radially outward and, when a sufficient force is developed, the springs 16 will be compressed so that disk 12 will separate slightly from disk 10 and thus permit a thin annular sheet or stream of particles to issue at the point 14 from between the two disks, the thickness of this stream depending of course upon the tension of springs 16, the speed of rotation of the structure, and the specific gravity of the particles. The amount of opening, however, will be but comparatively little more than the size of the maximum particles so that each of the particles will be practically mechanically engaged by the impeller so as to be propelled therefrom in a direction fixed by the arrangement or shape of the co-acting portions of the disks 10 and 12 at the point 14.

We claim as our invention:

1. An impeller comprising a pair of rotary coacting members forming a receiving chamber therebetween and having contacting surfaces at their outer edges, radially extending ribs carried by the chamber-forming surfaces of said members and extending substantially to but without interfering with the contacting of the contacting edges of said members, means for yieldingly holding said members together with a force sufficient to retard but not prevent the issuance of any particles from the interior of the chamber outward between the said contacting surfaces.

2. An impeller comprising a pair of rotary coacting members forming a receiving chamber therebetween and having contacting surfaces at their outer edges, radially extending ribs carried by the chamber-forming surfaces of said members without interfering with the contacting of the contacting edges of said members, means for yieldingly holding said members together with a force sufficient to retard but not prevent the issuance of any particles from the interior of the chamber outward between the said contacting surfaces, and a pair of guard lips 24 one carried by each of said members and arranged adjacent the contacting portions of the two members.

3. An impeller comprising a pair of rotary co-acting members forming a receiving chamber therebetween, radially extending ribs carried by the chamber forming surfaces of said members, a pair of guard lips 24, one carried by each of said members, and arranged adjacent the co-acting portions of the two members, and means for yieldingly holding said members together, for the purpose set forth.

4. An impeller comprising a pair of rotary co-acting members forming a receiving chamber therebetween, a pair of guard lips 24, one carried by each of said members, and arranged adjacent the co-acting portions of the two members and means for yieldingly holding said members together, for the purpose set forth.

In witness whereof, we have hereunto set our hands and seals at Enterprise, Kansas, this 13th day of August, A. D. one thousand nine hundred and nine.

W. J. EHRSAM. [L. S.]
ERNST H. SIEDER. [L. S.]
LAWRENCE N. MORSCHER. [L. S.]

Witnesses:
J. B. EHRSAM,
P. A. DIECKELMAN.